United States Patent [19]
Shoji et al.

[11] Patent Number: 6,089,937
[45] Date of Patent: Jul. 18, 2000

[54] CATHODE-RAY TUBE DIVIDING APPARATUS AND CATHODE-RAY TUBE DIVIDING METHOD

[75] Inventors: Takashi Shoji, Tokyo; Tadanori Kawamura, Saitama; Tomoya Oikawa, Tokyo, all of Japan

[73] Assignee: Sony Corporation, Tokyo, Japan

[21] Appl. No.: 09/316,043

[22] Filed: May 21, 1999

[30] Foreign Application Priority Data

Jun. 1, 1998 [JP] Japan ................................ P10-151241

[51] Int. Cl.⁷ ...................................................... H01J 9/52
[52] U.S. Cl. ................................................................. 445/2
[58] Field of Search .......................................... 445/2, 61

[56] References Cited

U.S. PATENT DOCUMENTS 5,556,018  9/1996  Kanehira ...................................... 445/2

FOREIGN PATENT DOCUMENTS

| | | |
|---|---|---|
| 0 593 143 | 4/1994 | European Pat. Off. . |
| 43 13 157 | 2/1994 | Germany . |
| 42 29 684 | 3/1994 | Germany . |
| 43 30 230 | 3/1995 | Germany . |
| 44 02 793 | 4/1995 | Germany . |

*Primary Examiner*—Kenneth J. Ramsey
*Attorney, Agent, or Firm*—Hill & Simpson

[57] ABSTRACT

Disclosed are a cathode-ray tube dividing apparatus and a cathode-ray tube dividing method intended to simply and stably divide a cathode-ray tube in a shortened time. The dividing apparatus includes a positioning means for fixedly positioning the used cathode-ray tube at a specific location, and a cathode-ray tube heating means which is brought into contact with a specific portion on side surfaces of the cathode-ray tube for linearly heating the specific portions. The cathode-ray tube heating means includes linear heating members for imparting thermal strain to the side surfaces of the cathode-ray tube upon receiving a power, thereby dividing the cathode-ray tube into the panel portion and the funnel portion, and a power supply for supplying a heating power to the linear heating members. The power supply is adapted to supply a first power for generating cracks on the side surfaces of the cathode-ray tube to the linear heating members, and to supply, after generation of the cracks, a second power larger than the first power to the linear heating members.

7 Claims, 18 Drawing Sheets

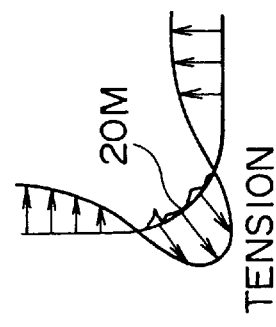
FIG. 20A SIDE VIEW
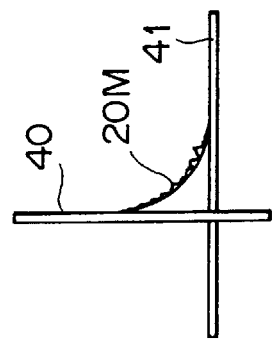
FIG. 20B TOP VIEW
FIG. 20C STRESS DISTRIBUTION
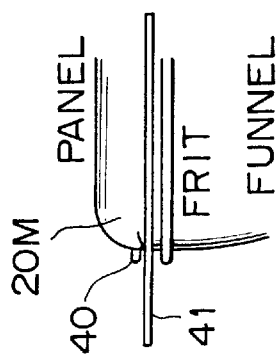
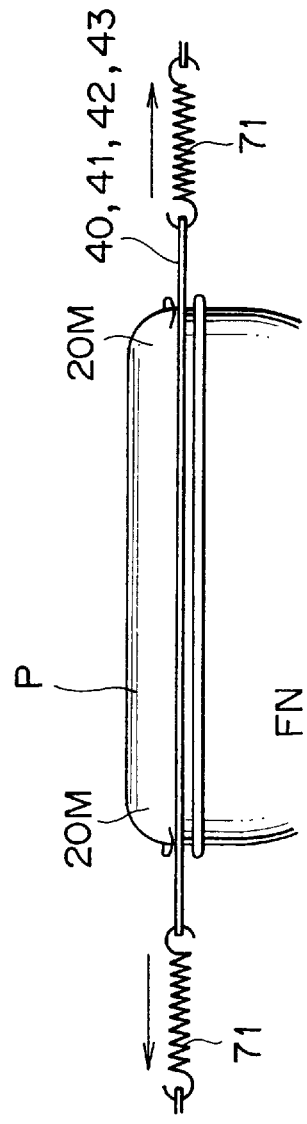
FIG. 21

CATHODE-RAY TUBE DIVIDING APPARATUS AND CATHODE-RAY TUBE DIVIDING METHOD

RELATED APPLICATION DATA

The present application claims priority to Japanese Application No. P10-151241 filed Jun. 1, 1998, which application is incorporated herein by reference to the extent permitted by law.

BACKGROUND OF THE INVENTION

The present invention relates to a cathode-ray tube dividing apparatus and a cathode-ray tube dividing method most suitable to disassemble a cathode-ray tube (CRT) into pieces for recycling.

Recently, the spotlight has been focused on recycling of resources and prevention of environmental destruction. To meet such a demand, studies have been extensively made to reuse displays, typically cathode-ray tubes (Braun tubes) of used television sets and computer monitors. In particular, it has been of urgent necessity to rapidly and efficiently reuse disposed television sets which has been progressively increased.

A cathode-ray tube, used as an image receiver incorporated in a television set or the like, is a glass structure composed of a panel portion (also called as a face portion) and a funnel portion (also called as a panel skirt portion). The panel portion is made from a substantially transparent glass material for improving light transmittance, and the funnel portion is made from a glass material in which lead is mixed for preventing leakage of X-rays caused by collision of electron beams accelerated at a high voltage with a substance. The funnel portion and the panel portion are welded in a shield fashion to each other with frit glass (solder glass) into a tube shape.

Outwardly, an electron gun, a deflection yoke and the like are mounted on the external rear side of a cathode-ray tube, and a shadow mask (or aperture grill) is provided in the cathode-ray tube. A fluorescent screen provided on the inner surface side of the panel portion is regularly coated with phosphors of three colors (red, green and blue).

A method of recycling a cathode-ray tube of this type has been disclosed, for example, in Japanese Patent Laid-open No. Hei.9-171773, in which the cathode-ray tube is divided into a panel portion and a funnel portion by pressing heat wires on side surfaces of the cathode-ray tube. The heat wires are moved to the side surfaces of the cathode-ray tube by a motor and are pressed on the side surfaces of the cathode-ray tube.

The above heat wire pressing method, however, has a problem. Under the present circumstances, the method includes the steps of generating cracks at dividing glass portions by applying an electrical power to the heat wires in accordance with an energizing condition in which a power amount and an energizing time are made constant irrespective of the size of a cathode-ray tube, and after generation of cracks, tapping four corners of the cathode ray-tube, on which the heat wires are not pressed, with a tool such as a chisel to grow the cracks thus generated to such an extent as to certainly, easily divide the cathode-ray tube. If an electrical power being large enough to allow cracks generated on the four sides to come to be linked to each other at the four corners is applied to the heat wires, cracks may be too rapidly generated to induce cracking of portions other than the desirable portions on which the heat wires are pressed, for example, inside the glass portions on the funnel and/or the panel. To prevent such an inconvenience as well as to ensure the division, the growth of cracks is made by the next step of tapping the corners of the cathode-ray tube with a tool such as a chisel. Accordingly, the related art cathode-ray tube dividing apparatus is configured such that:

(1) the amount of power is suppressed at a small value; and (2) the function of tapping on four corners with a tool such as a chisel is provided, so that such an apparatus has a problem that it takes a lot of time to divide a cathode-ray tube. The increased time required to divide one cathode-ray tube means that the number of the dividing apparatuses required to divide a specific number of cathode-ray tubes is increased, to thereby raise the recycling cost of the cathode-ray tubes.

SUMMARY OF THE INVENTION

An object of the present invention is to solve the above-described problem and to provide a cathode-ray tube dividing apparatus and a cathode-ray tube dividing method capable of simply and stably dividing a cathode-ray tube in a shortened time.

To achieve the above object, according to a first aspect of the present invention, there is provided a cathode-ray tube dividing apparatus for dividing a used cathode-ray tube into a panel portion and a funnel portion, including; a positioning means for fixedly positioning the used cathode-ray tube at a specific location, and a cathode-ray tube heating means which is brought into contact with a specific portion on side surfaces of the cathode-ray tube for linearly heating the specific portions, wherein the cathode-ray tube heating means includes; linear heating members for imparting thermal strain to the side surfaces of the cathode-ray tube upon receiving a power, thereby dividing the cathode-ray tube into the panel portion and the funnel portion, and a power supply for supplying a heating power to the linear heating members, the power supply being adapted to supply a first power for generating cracks on the side surfaces of the cathode-ray tube to the linear heating members, and to supply, after generation of the cracks, a second power larger than the first power to the linear heating members.

The cathode-ray heating means preferably includes a control means for independently setting and recording values of the first and second heating powers to be supplied from the power supply to the heating members in accordance with the size of the cathode-ray tube.

The cathode-ray tube heating means preferably includes a control means for supplying a first power for generating cracks on the side surfaces of the cathode-ray tube to said linear heating members for a specified time to generate cracks, and supplying, after generation of the cracks, a second power larger than said first power to said linear heating members for a time shorter than said specified time defined for said first power.

According to a second aspect of the present invention, there is provided a cathode-ray tube dividing method for dividing a used cathode-ray tube into a panel portion and a funnel portion, including the steps of; fixedly positioning the used cathode-ray tube at a specific location, pressing a linear heating means onto side surfaces of the cathode-ray tube thus positioned, generating cracks on the side surfaces of the cathode-ray tube by supplying a first power to the linear heating means, and growing the cracks, after generation of the cracks, by supplying a second power larger than the first power to the linear heating means.

The above dividing method preferably further includes the steps of; generating cracks on the side surfaces of the cathode-ray tube along a division line by supplying a first power preset in accordance with the size of the cathode-ray tube to the linear heating means, and growing the cracks, after generation of the cracks, by supplying a second power preset in accordance with the size of the cathode-ray tube and being larger than the first power to the linear heating means.

According to a third aspect of the present invention, there is provided a cathode-ray tube dividing method for dividing a used cathode-ray tube into a panel portion and a funnel portion, including the steps of; fixedly positioning the used cathode-ray tube at a specific location, forming grooves for inducing division in side surfaces of the cathode-ray tube at part of locations to be divided, pressing a linear heating means onto the side surfaces of the cathode-ray tube along the grooves, generating cracks on the side surfaces of the cathode-ray tube by supplying a first power to the linear heating means, and growing the cracks, after generation of the cracks, by supplying a second power larger than the first power to the linear heating means.

According to a fourth aspect of the present invention, there is provided a cathode-ray tube dividing method for dividing a used cathode-ray tube into a panel portion and a funnel portion, including the steps of; fixedly positioning a cathode-ray tube at a specific location, forming grooves for inducing division in side surfaces of the cathode-ray tube at positions offset onto the panel portion side from a joining line between the panel portion and a funnel portion, pressing a linear heating means onto the side surfaces of the cathode-ray tube along the grooves, generating cracks on the side surfaces of the cathode-ray tube by supplying a first power to the linear heating means, and growing the cracks, after generation of the cracks, by supplying a second power larger than the first power to the linear heating means.

The present invention is advantageous in that since the power can be rapidly increased after generation of the cracks, the crack having been already generated rapidly grow by heat-shock, with a result that the cathode-ray tube can be certainly divided into the panel portion and the funnel portion without the need of tapping the corners of the cathode-ray tube.

The present invention is also advantageous in that since the power supply changes values of the first and second powers to be supplied to the linear heating members in accordance with the size of the cathode-ray tube, it is possible to divide the cathode-ray tube with a heating power suitably adjusted to the size of the cathode-ray tube.

BRIEF DESCRIPTION OF THE DRAWINGS

FIGS. 20A, 20B and 20C are views showing a state in which a concentrated crack is generated in the cathode-ray tube;

FIG. 21 is a view showing an example in which springs are provided at both ends of the linear heating member.

DETAILED DESCRIPTION OF THE PREFERRED EMBODIMENTS

Hereinafter, preferred embodiments of the present invention will be described with reference to the accompanying drawings.

Figure 1:
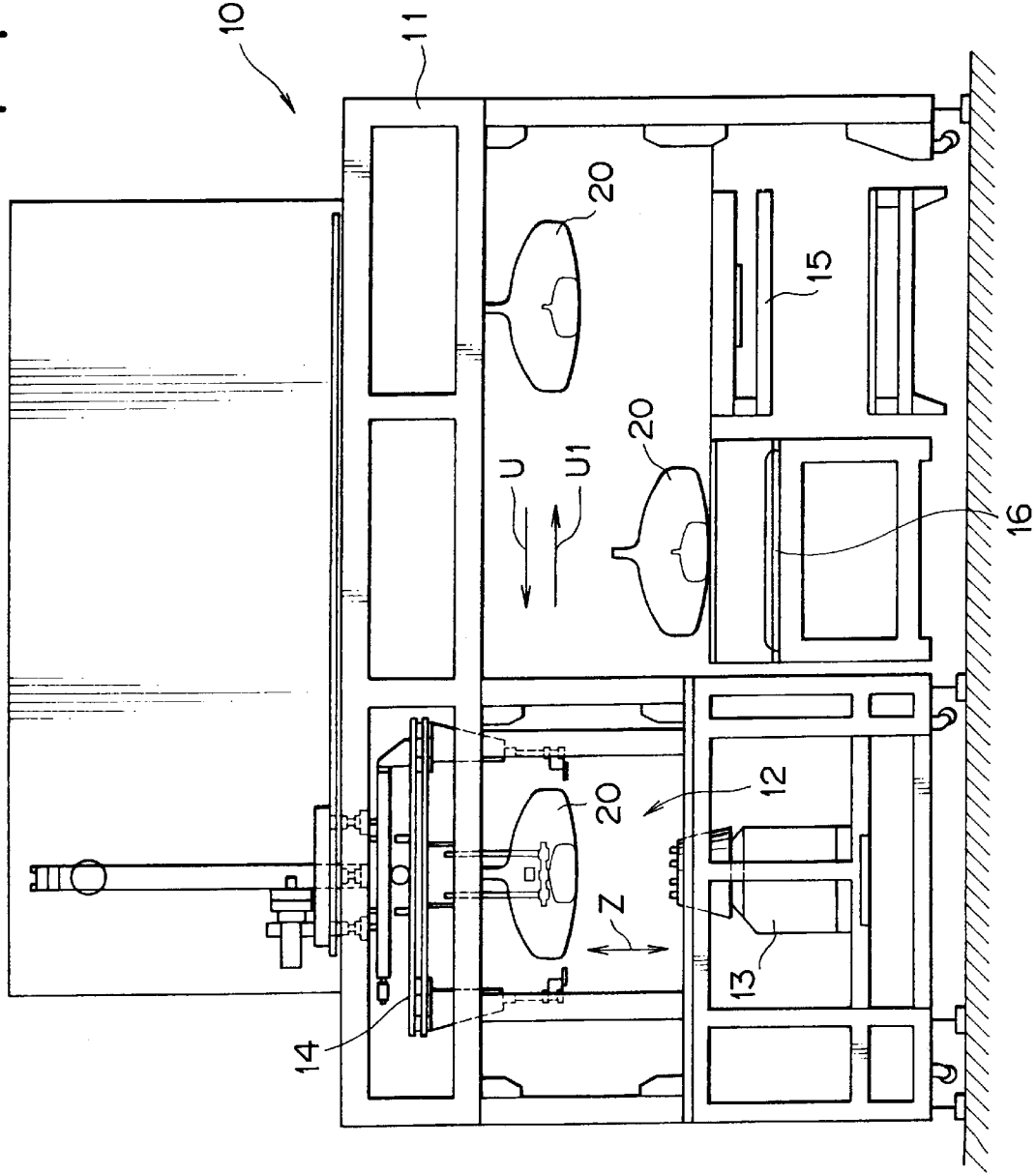
FIG. 1 is a front view showing a preferred embodiment of a cathode-ray tube dividing apparatus of the present invention.
Figure 2:
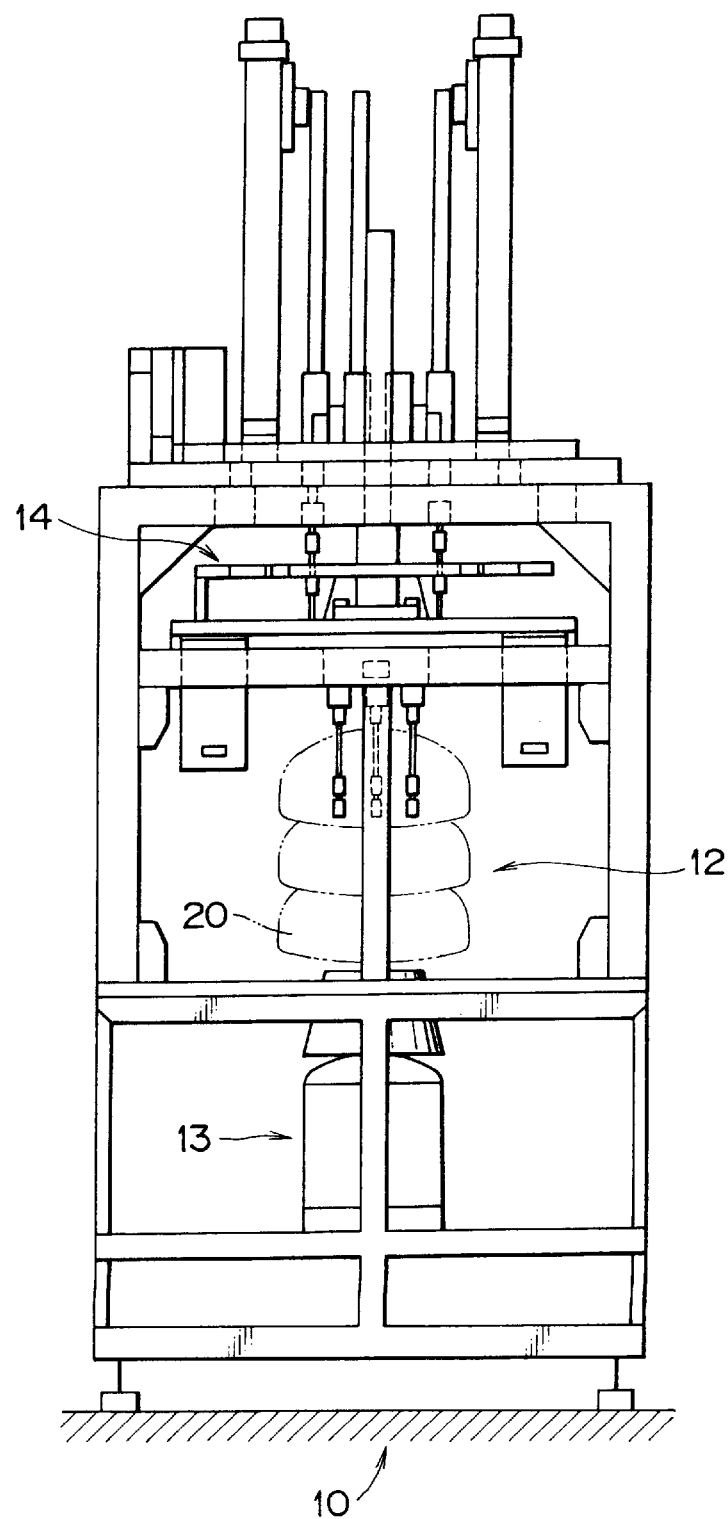
FIG. 2 is a side view of the cathode-ray tube dividing apparatus.
Figure 3:
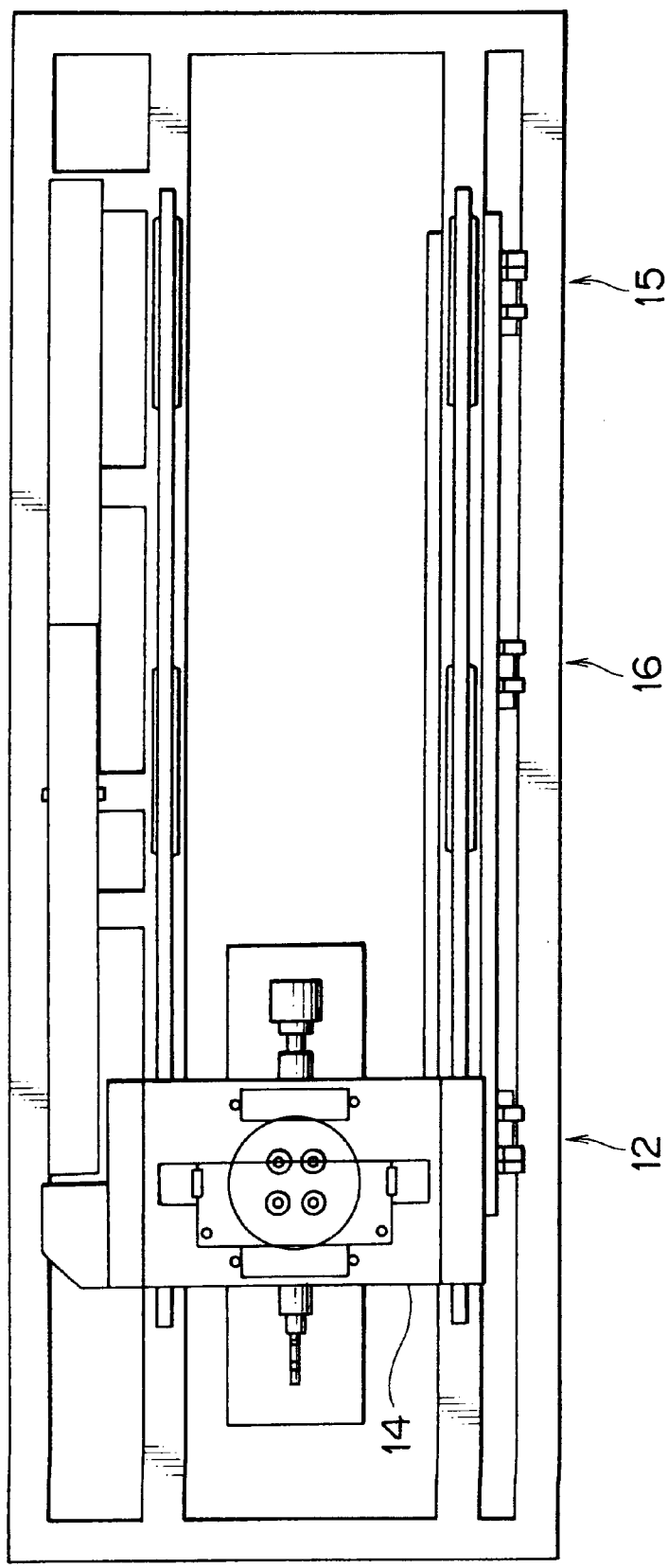
FIG. 3 is a plan view of the cathode-ray tube dividing apparatus.

FIG. 1 shows a preferred embodiment of a cathode-ray tube dividing apparatus of the present invention. A cathode-ray tube dividing apparatus 10 includes, as shown in FIGS. 1 to 3, a main body frame 11, a dividing unit 12, a back-up unit 13, a transfer unit 14, a carry-in conveyor 15, and a carry-out conveyor 16.

Referring to FIG. 1, the carry-in conveyor 15 is adapted to carry a cathode-ray tube 20 to be divided in the apparatus 10. The cathode-ray tube 20 carried in the apparatus 10 by the carry-in conveyor 15 has been already removed of an explosion-proof band and subjected to cleaning treatment. The transfer unit 14 is adapted to move the cathode-ray tube 20 having been carried in the apparatus 10 by the carry-in conveyor 15 in the direction U and to supply it to the back-up unit 13 of the dividing unit 12.

The back-up unit 13 is adapted to mount the cathode-ray tube 20 and vertically move it up and down in the direction Z for positioning linear heating members to be described later at specific dividing locations of the cathode-ray tube 20. The cathode-ray tube 20 having been divided at the dividing unit 12 is moved up and down in the direction U1 up to a position over the carry-out conveyor 16 by the transfer unit 14, and is then carried out of the apparatus 10 by the carry-out conveyor 16.

Figure 4:
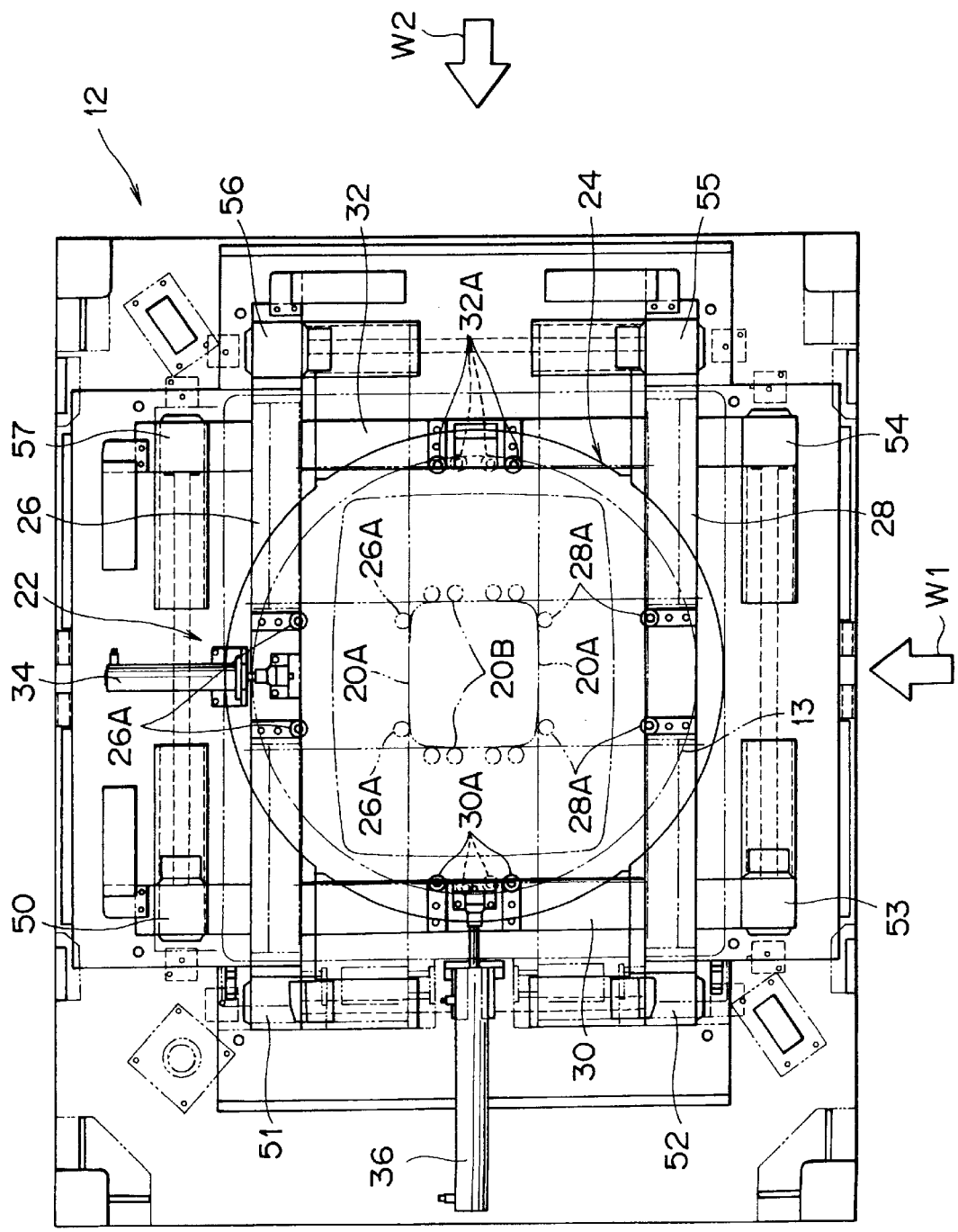
FIG. 4 is a plan view showing an embodiment of a dividing unit of the cathode-ray tube dividing apparatus.
Figure 5:
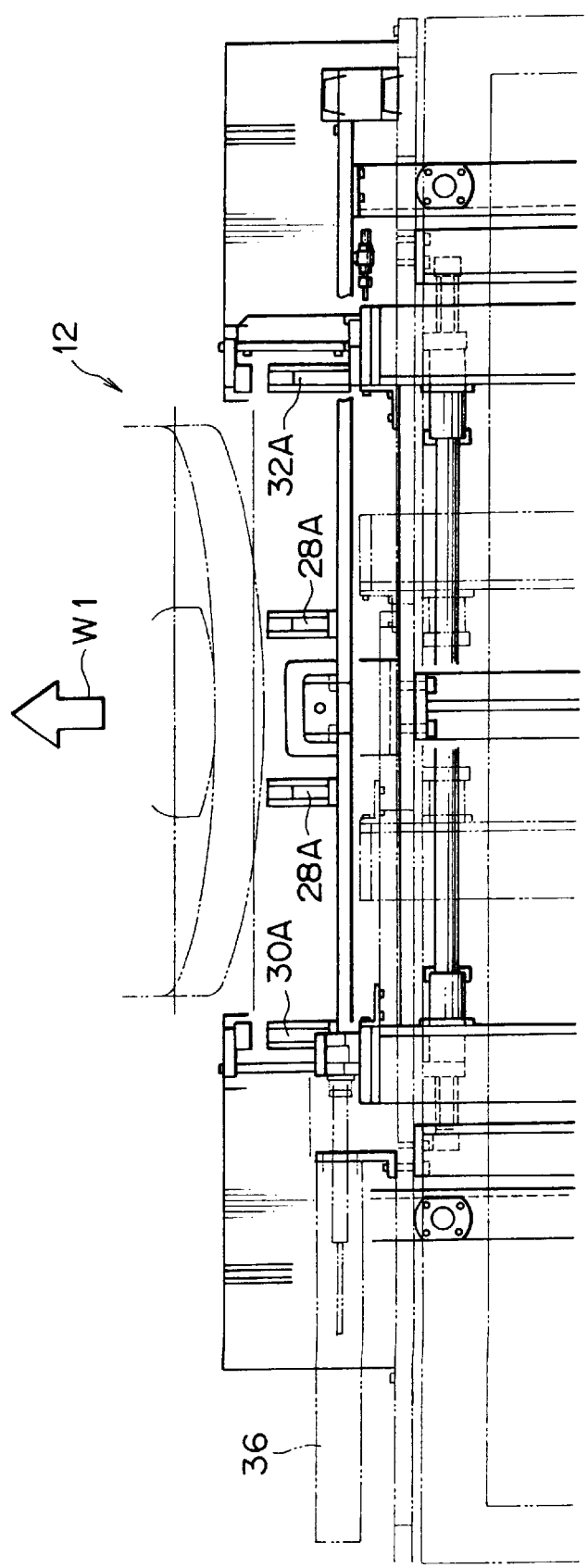
FIG. 5 is a side view of the dividing unit shown in FIG. 4 seen from an arrow W1.
Figure 6:
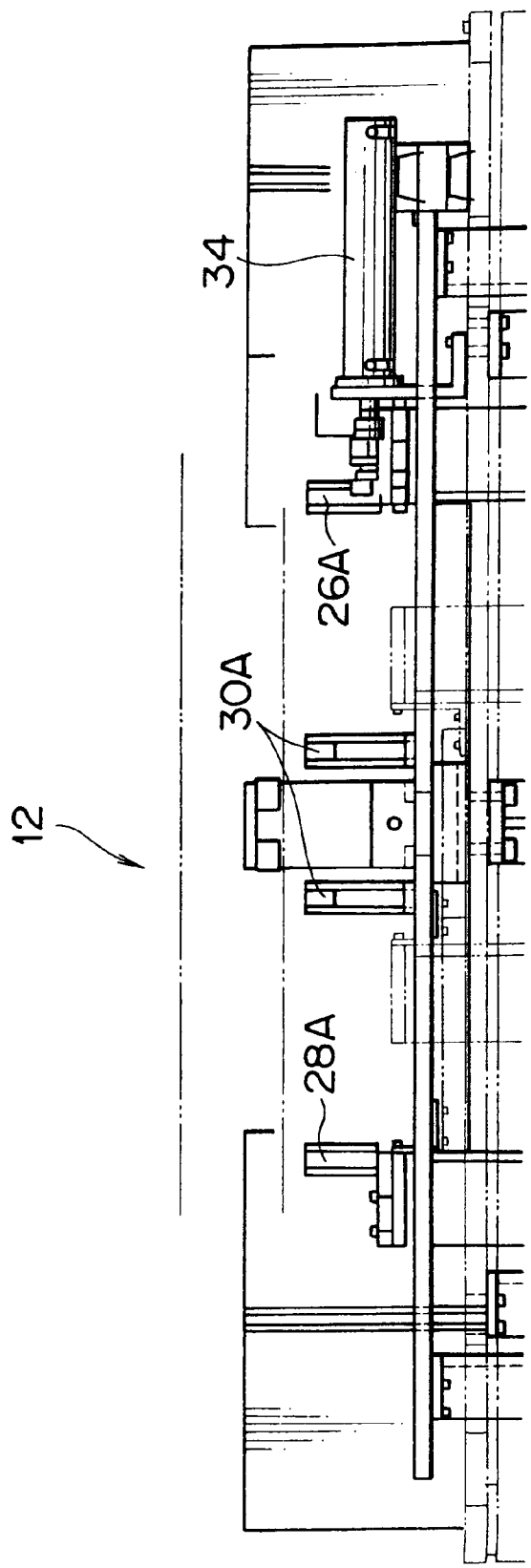
FIG. 6 is a side view of the dividing unit shown in FIG. 4 seen from an arrow W2.

FIG. 4 is a plan view of a preferred embodiment of the dividing unit 12 shown in FIG. 1, FIG. 5 is a side view showing the dividing portion 12 seen along an arrow W1 of FIG. 4, and FIG. 6 is a side view showing the dividing unit 12 seen along an arrow W2 of FIG. 4.

Figure 7:
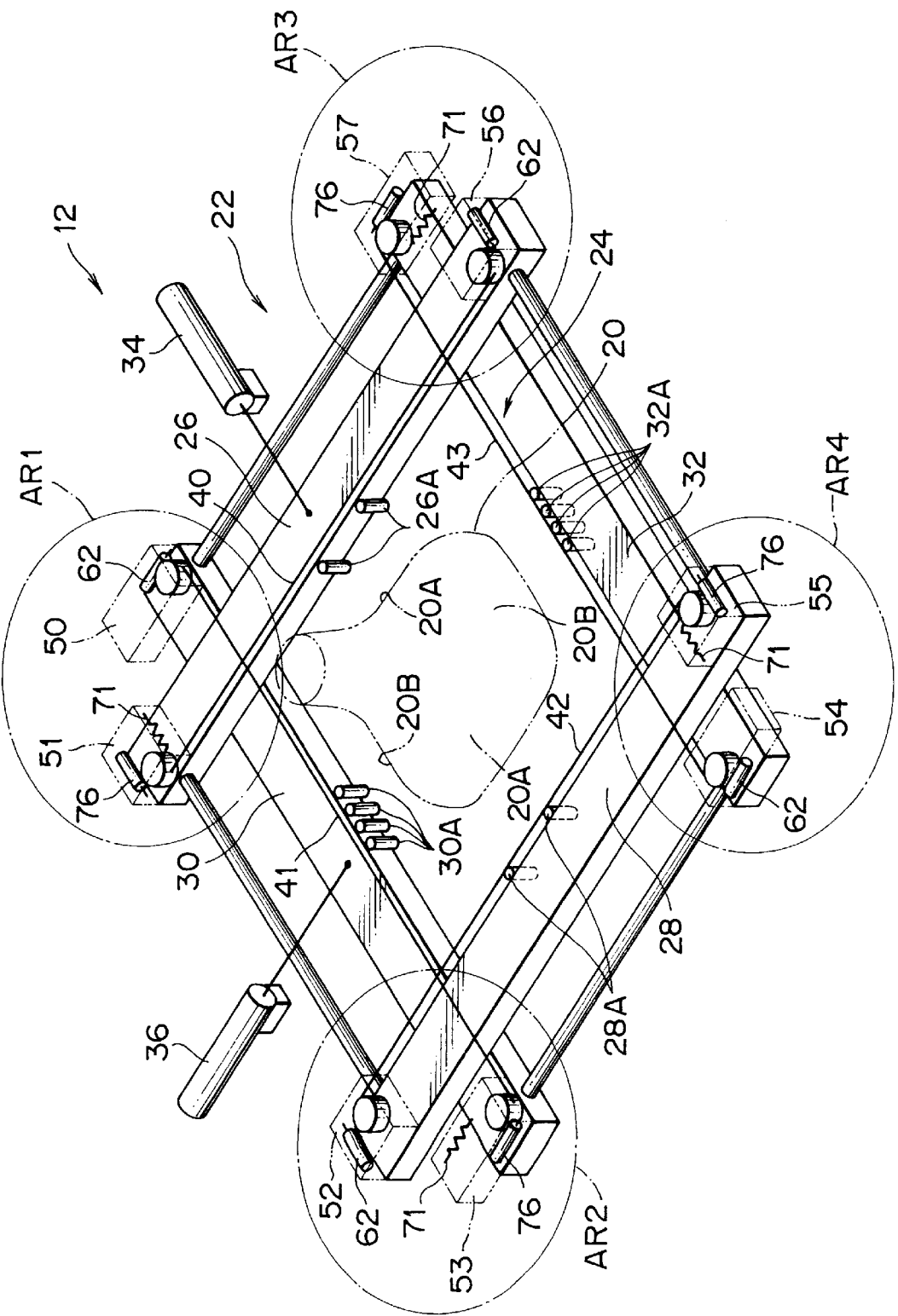
FIG. 7 is a schematic perspective view of the dividing unit shown in FIG. 4.
Figure 8:
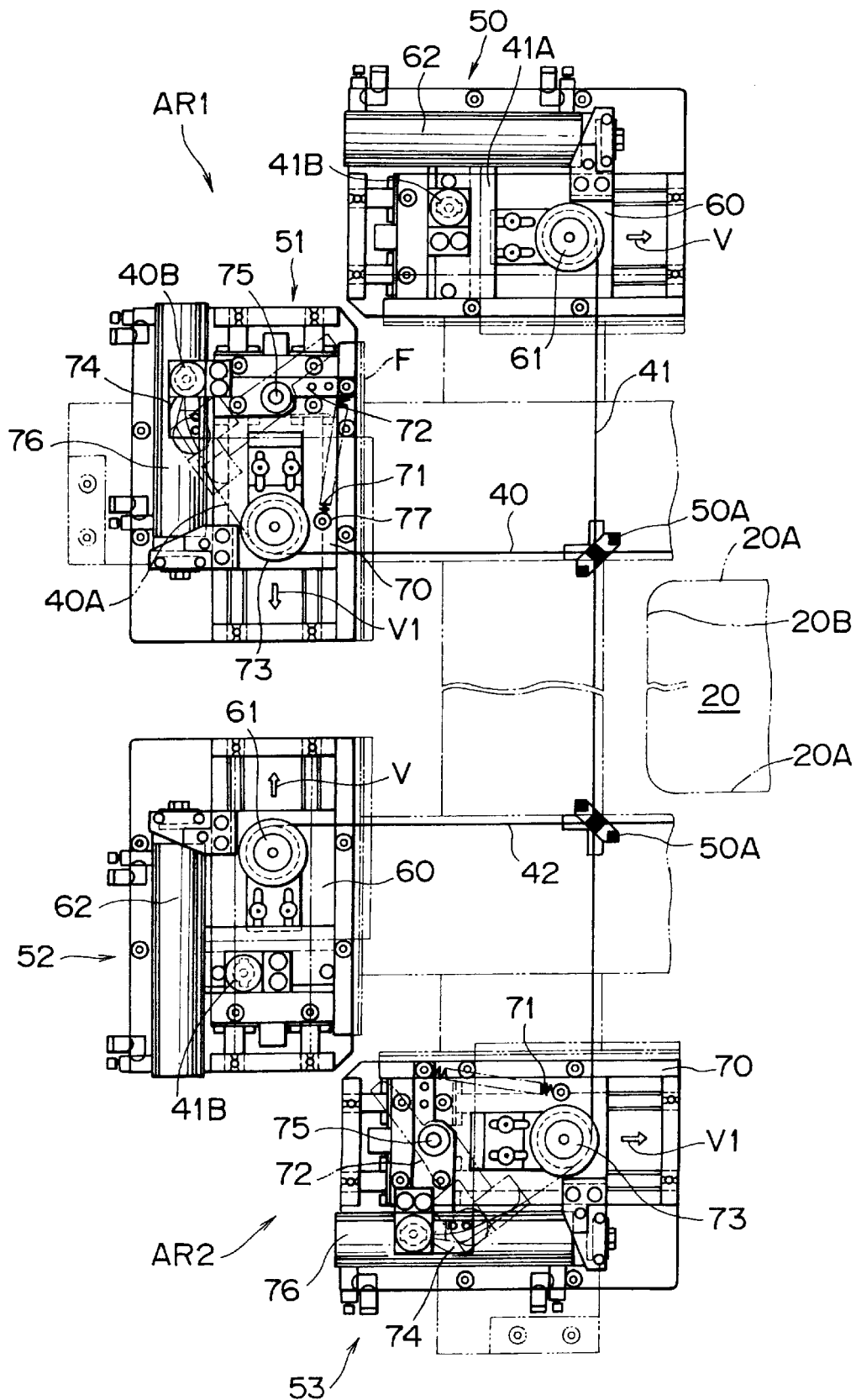
FIG. 8 is a view showing areas AR1 and AR2 shown in FIG. 7.
Figure 9:
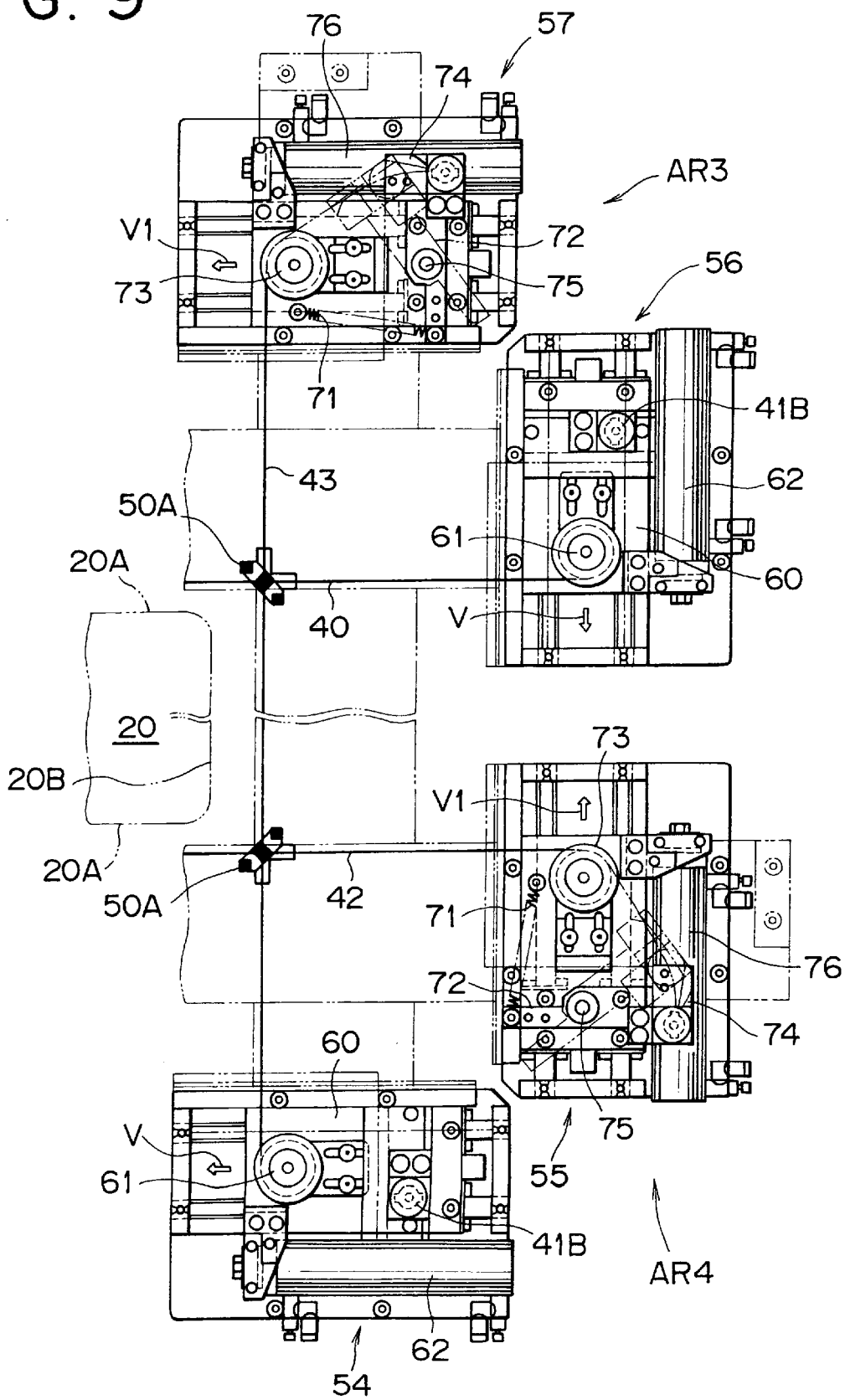
FIG. 9 is a view showing areas AR3 and AR4 shown in FIG. 7.

FIG. 7 is a schematic view of the general structure of the dividing unit 12 shown in FIG. 4, FIG. 8 is a detailed view of the structures of areas AR1 and AR2 shown in FIG. 7, and FIG. 9 is a detailed view of the structures of areas AR3 and AR4 shown in FIG. 7.

Referring to FIGS. 4 and 7, the dividing unit 12 generally has a positioning means 22 for positioning the cathode-ray tube 20 and a heating means 24 for heating the cathode-ray tube 20.

The positioning means 22 has two pieces of first positioning sliders 26 and 28, two pieces of second positioning sliders 30 and 32, a cylinder 34 as a first driving means, and a cylinder 36 as a second driving means.

As shown in FIG. 7, the first positioning sliders 26 and 28 are arranged in parallel being away from each other with the cathode-ray tube 20 put therebetween, and similarly the second positioning sliders 30 and 32 are arranged in parallel being away from each other with the cathode-ray tube 20 put therebetween. That is to say, the first positioning sliders 26 and 28 and the second positioning sliders 30 and 32 are disposed crosswise in two parallels.

For example, the first positioning sliders 26 and 28 are positioned over the second positioning sliders 30 and 32. The cylinder 34 is adapted to move the first positioning sliders 26 and 28 close to the cathode-ray tube 20 in synchronization with each other, and finally to bring them into contact with the cathode-ray tube 20. Similarly, the cylinder 36 is adapted to move the second positioning sliders 30 and 32 close to the cathode-ray tube 20 in synchronization with each other, and finally to bring them into contact with the cathode-ray tube 20.

The first positioning sliders 26 and 28 can be made close to each other in synchronization by a mechanism (not shown) operated by the cylinder 34, and similarly, the second positioning sliders 30 and 32 can be made close to each other in synchronization by a mechanism (not shown) operated by the cylinder 36.

For example, a turn buckle or the like can be used as the mechanism for making the first positioning sliders 26 and 28 close to each other, and similarly, a turn buckle or the like can be used as the mechanism for making the second positioning sliders 30 and 32 close to each other.

Referring to FIG. 7, rollers 26A and 28A for contact with the cathode-ray tube 20 are provided on the inner sides of the first positioning sliders 26 and 28, respectively. These rollers 26A and 28A can be brought into contact with long-sides 20A of the side surfaces of the cathode-ray tube 20. Similarly, a plurality of rollers 30A and 32A are provided on the inner sides of the second positioning sliders 30 and 32, respectively. These rollers 30A and 32A can be brought into contact with the short-sides 20B of the side surfaces of the cathode-ray tube 20.

Figure 13:
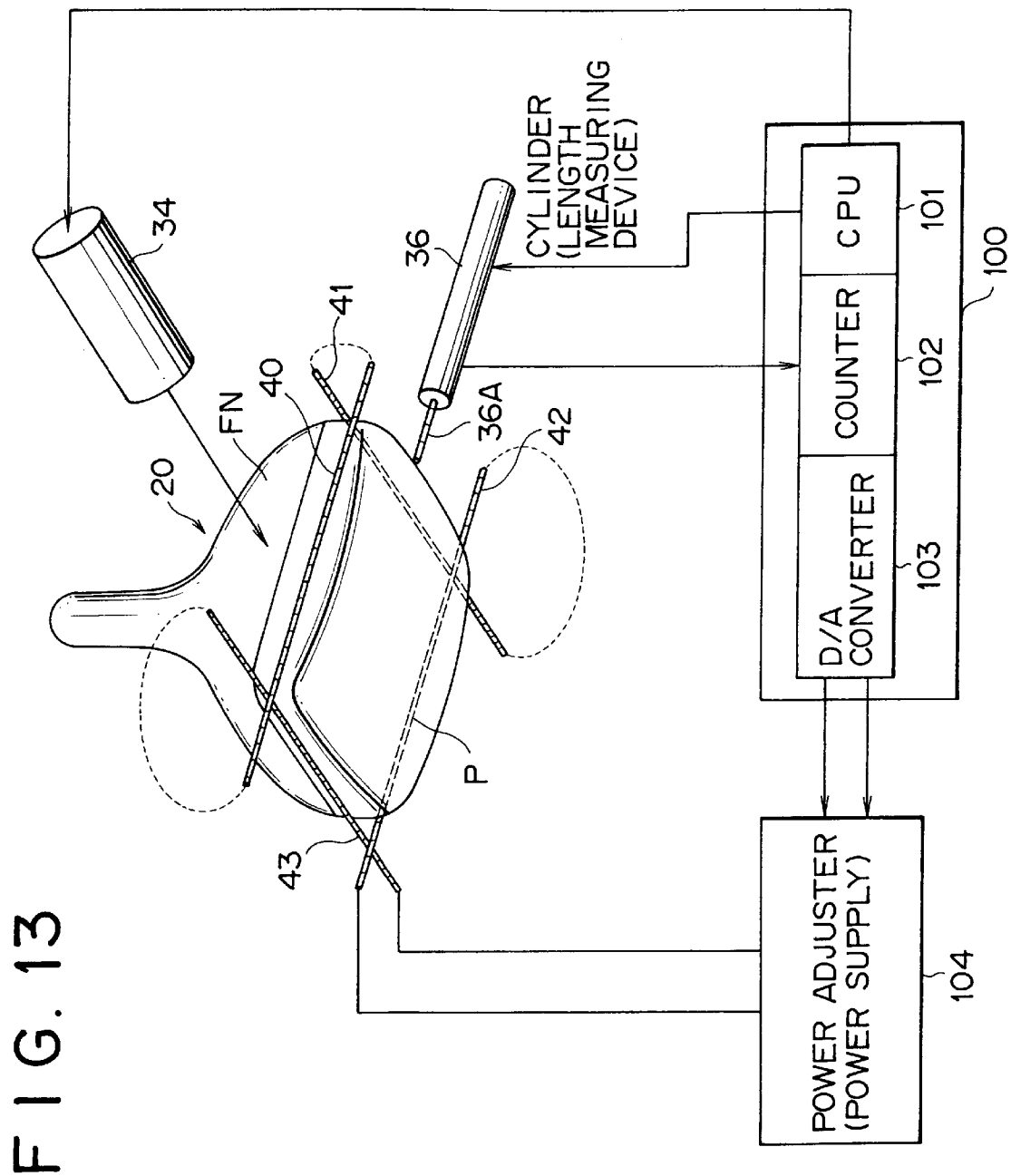
FIG. 13 is a perspective view showing a cathode-ray tube, a control means, and a power adjuster.

Referring to FIG. 7, the heating means 24 for heating the cathode-ray tube 20 has four pieces of linear heating members 40, 41, 42 and 43, heating member holding means 50, 51, 52, 53, 54, 55, 56 and 57, four pieces of springs 71 as biasing means, and a power adjuster 104 as a power supply shown in FIG. 13.

The four pieces of linear heating means 40, 41, 42 and 43 are adapted to impart thermal strain to the side surfaces of the cathode-ray tube 20 upon receiving a power, to thereby divide the cathode-ray tube 20 into a panel portion and a funnel portion.

Figure 22:
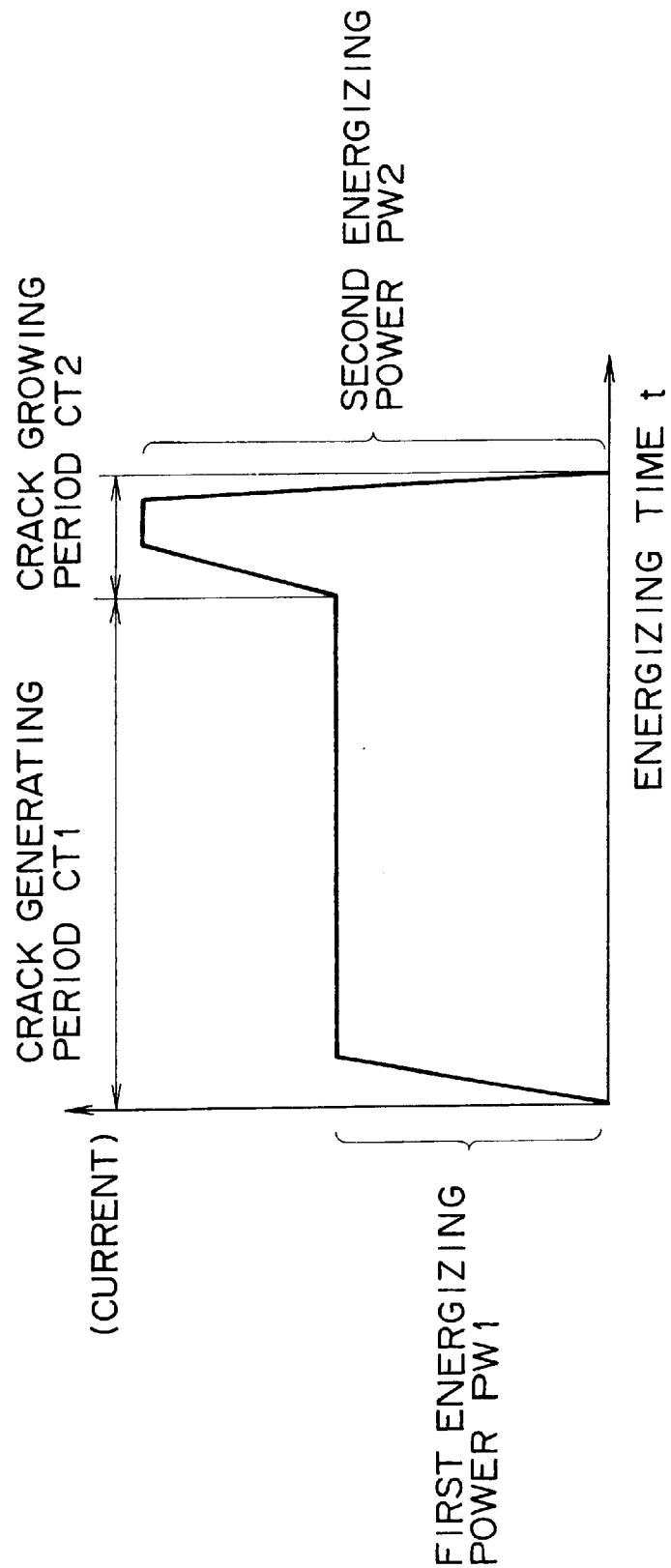
FIG. 22 is a diagram showing an example of an energizing condition under which a power is applied from a power supply to the linear heating members.

Referring to FIG. 13, the power adjuster (power supply) 104 can supply a power to the four pieces of linear heating members 40, 41, 42 and 43 under an energizing condition shown in FIG. 22.

Figure 15:
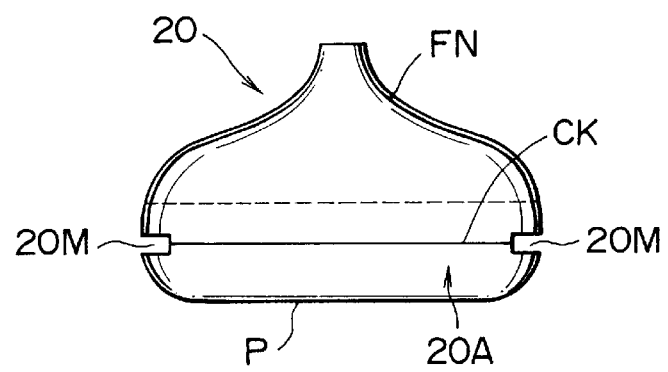
FIG. 15 is a view showing grooves provided in four corners of the cathode-ray tube.

FIG. 22 shows a relationship between an energizing time and an energizing power (current). With respect to the energizing time, a crack generating period CT1 and a crack growing period CT2 are set. The crack generating period CT1 is a duration in which cracks (dividing grooves) CK are generated on the four side surfaces 20A of the cathode-ray tube 20 as shown in FIG. 15. The crack growing period CT2 is a duration in which the cracks this generated grow.

During the crack generating period CT1, the power adjuster 104 shown in FIG. 13 supplies a first energizing power TW1 to the four pieces of linear heating members 40, 41, 42 and 43. On the other hand, in the crack growing period CT2, the power adjuster 104 shown in FIG. 13 supplies a second energizing power PW2 to the four pieces of linear heating members 40, 41, 42 and 43 as shown in FIG. 22. The second energizing power PW2 (current) is set to be larger than the first energizing power PW1 (current).

In the example shown in FIG. 22, the crack generating period CT1 is set to be longer than the crack growing period CT2.

The heating member holding means 50 to 57 shown in FIG. 7 are adapted to hold both ends of the linear heating members 40, 41, 42 and 43. The springs 71 as the means for biasing the heating members are used to generate biasing forces for bringing the linear heating members 40 to 43 into close-contact with the curved side surfaces of the cathode-ray tube 20 at specific tensions.

The holding means 50 to 57 shown in FIGS. 7 to 9 are disposed at the ends of the first positioning sliders 26 and 28 and the second positioning sliders 30 and 32, respectively. To be more specific, the holding means 50 and 53 are disposed at both ends of the second positioning slider 30 and the holding means 57 and 54 are disposed both ends of the second positioning slider 32. Similarly, the holding sliders 51 and 56 are disposed at both ends of the first positioning slider 26 and the holding means 52 and 55 are disposed at both ends of the first positioning slider 28.

The holding means 50 and 53 hold both the ends of the linear heating member 40 and the holding means 57 and 54 hold both ends of the linear heating member 43. Similarly, the holding means 51 and 56 hold both ends of the linear heating member 40 and the holding means 52 and 55 hold both ends of the linear heating member 42.

FIG. 8 shows mechanical details of the areas AR1 and AR2 shown in FIG. 7, and FIG. 9 shows mechanical details of the areas AR3 and AR4 shown in FIG. 7.

FIG. 8 shows the holding means 50, 51, 52 and 53, linear heating members 40, 41, 42, and the like, and FIG. 9 shows the holding means 54, 55, 56 and 57, the linear heating members 43, 40, 42, and the like.

Referring to FIGS. 7 to 9, as described above, both ends of the linear heating member 40 are held by the holding means 51 and 56, both ends of the linear heating member 41 are held by the holding means 50 and 53, both ends of the linear heating member 42 are held by the holding means 52 and 55, and both ends of the linear heating member 43 are held by the holding means 57 and 54.

As shown in FIGS. 8 and 9, the linear heating members 40, 41, 42 and 43 are electrically insulated from each other at four positions by means of mounting members 50A in order not to be electrically in contact with each other.

Referring to FIGS. 8 and 9, according to this embodiment, among the eight pieces of holding means 50 to 57, each of the holding means 50, 52, 54 and 56 is slightly different in structure from each of the holding means 51, 53, 55 and 57.

The holding means 50, 52, 54 and 56 have the same structure, each of which has a slide member 60, a roller 61 and a cylinder 62. The slide member 60 shown in FIG. 8 is moved by a specific stroke in the direction V by operation of the cylinder 62. One end of the linear heating member is wound around the roller 61. For example, one end 41A of the linear heating member 41 shown in FIG. 8 is wound around the roller 61 and is fixed at a fixing portion 41B of the holding means. Such a structure is applied to each of the holding means 50, 52, 54 and 56.

On the contrary, each of the holding means 51, 53, 55 and 57 includes, as shown in FIGS. 8 and 9, a slide member 70, a spring (tensile spring or biasing means) 71, a lever 72, a roller 73, a roller 74, a center axis 75, and a cylinder 76. The cylinder 76 allows the slide member 70 to be moved by a specific stroke in the direction V1. The rollers 73 and 74 are adapted to guide, for example, one end 40A of the linear heating member 40, and the one end 40A guided by the rollers 73 and 74 is then fixed at a fixing portion 40B. The roller 74 is mounted at one end of the lever 72, and the spring 71 is mounted between the other end of the lever 72 and a mounting portion 77 of the slide member 70.

Such a structure of the holding means 51 is also applied to each of the holding means 53, 55 and 57. That is to say, for each of the holding means 51, 53, 55 and 57, the other end of the associated linear heating member, for example, the other end 40A of the heating member 40 is movable against the biasing force of the spring 71. To be more specific, when the lever 72 is turned around the center axis 75 in the direction F in FIG. 8, there occurs a margin of the change in length of the linear heating member 40.

Referring to FIGS. 8, 9 and 7, with respect to each of the linear heating members 40, 41, 42 and 43, one end is fixed by the associated one of the holding means 50, 52, 54 and 56 but the other end is not fixed by the associated one of the holding means 51, 53, 55 and 57. That is to say, the length of the other end portion of each of the linear members 40, 41, 42 and 43 at the associated one of the holding means 51, 53, 55 and 57 can be changed against the biasing force of the spring 71. Accordingly, the linear heating members 40, 41, 42 and 43 can be brought into close-contact with the curved side surfaces on the long-side 20A and short-side 20B of the cathode-ray tube 20.

Next, a work of positioning the cathode-ray tube 20 by the positioning means and a work of dividing the cathode-ray tube 20 into the panel portion and funnel portion by the cathode-ray tube heating means 24 will be described with reference to FIGS. 10 to 12 and FIG. 22.

Figure 10:
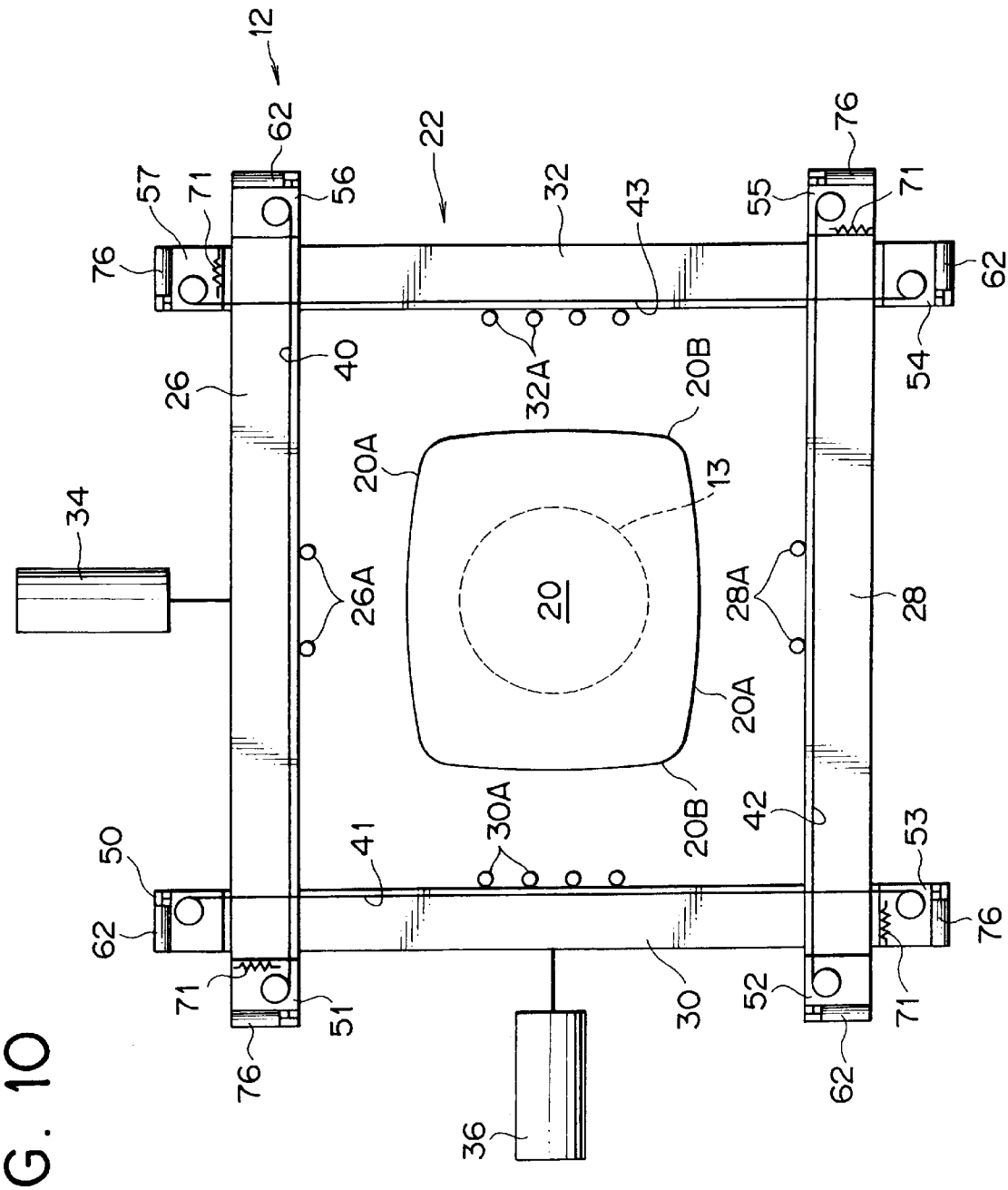
FIG. 10 is a view showing the initial state of the dividing unit.

As shown in FIG. 1, the cathode-ray tube 20 having been already removed of an explosion-proof band and subjected to cleaning treatment is carried in the apparatus 10 by the carry-in conveyor 15. The cathode-ray tube 20 is delivered from the carry-in conveyor 15 side to the back-up unit 13 side and is mounted on the back-up unit 13 by the transfer unit 14. FIG. 10 shows a state in which the cathode-ray tube 20 is mounted on the back-up unit 13. In this case, the panel portion side of the cathode-ray tube 20 is placed on the back-up unit 13.

Figure 11:
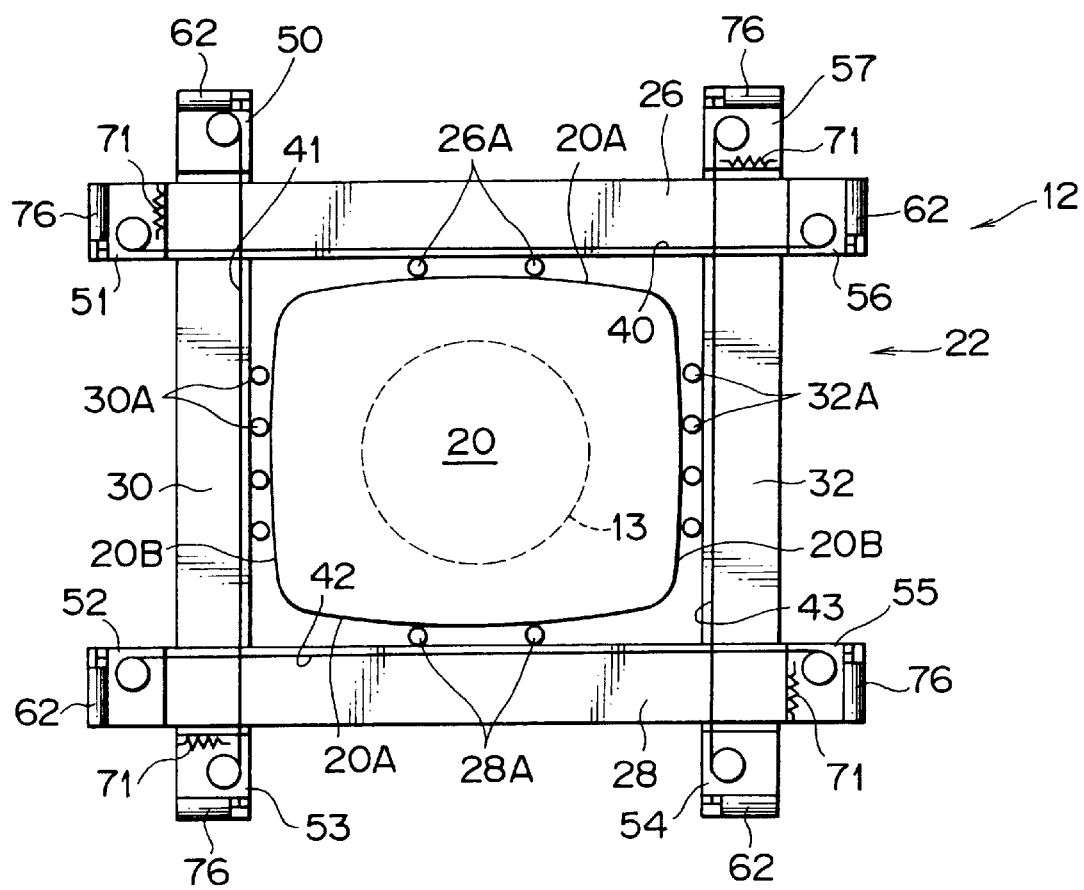
FIG. 11 is a view showing a state in which the cathode-ray tube is positioned by sliders of the dividing unit.

As shown in FIG. 13, when the cylinders 34 and 36 are operated on the basis of a command supplied from a central processing unit (CPU) 101 of a control means 100, the state shown in FIG. 10 is changed into a state shown in FIG. 11. To be more specific, the first positioning sliders 26 and 28 and second positioning sliders 30 and 32 are made close to the cathode-ray tube 20, respectively, and the rollers 26A, 28A, 30A and 32A are brought into contact with the long-sides 20A and short-sides 20B of the cathode-ray tube 20. In this way, the cathode-ray tube 20 can be correctly positioned on the back-up unit 13.

In this case, for example, the cylinder 36 is connected to a counter 102 of the control means 100 as shown in FIG. 13. The cylinder 36 and the counter 102 serve as a length measuring device. The moved amount of a rod 36A of the cylinder 36 can be counted by the counter 102, thus obtaining a signal of the size of the cathode-ray tube 20 to be divided and it is supplied to the CPU 101 of the control means 100.

A program regarding power amounts to be applied to the linear heating members 40, 41, 42 and 43 are previously stored in the CPU 101. That is to say, the CPU 101 calculates the size (type, or inch-size) of the cathode-ray tube 20 to be divided via the counter 102, and it also has a pre-set data table containing a relationship between a power amount and an energizing time required for the size of the cathode-ray tube 20.

One example of such a data table to be referred is shown in FIG. 22. As described above, the power adjuster 104 shown in FIG. 13 supplies a power in two steps to the four pieces of linear heating members 40, 41, 42 and 43 in accordance with the energizing condition stated in the data table as shown in FIG. 22 previously set in the CPU 101.

Besides, the CPU 101 sets a power amount and an energizing time in accordance with the size of the cathode-ray tube 20 obtained by the counter 102, and supplies a signal concerning the power amount and energizing time to the power adjuster 104 via a D/A converter 103. That is to say, a control voltage is applied from the D/A converter 103 to a control terminal of the power adjuster 104.

For instance, a cathode-ray tube having a size of 20 inches, the first energizing power PW1 is set at 0.7 KW and the second energizing power PW2 is set at 1 KW.

The power adjuster 104, which has received the control voltage, energizes in two steps the linear heating members 40, 41, 42 and 43 in accordance with the energizing condition shown in FIG. 22. When the crack growing period CT2 is terminated after an elapse of a specific energizing time, the supply of the power from the power adjuster 104 to the linear heating members 40, 41, 42 and 43 is stopped because no control voltage is given from the CPU 101 side to the power adjuster 104.

The four pieces of linear heating members 40, 41, 42 and 43 are electrically connected in series to the power adjuster 104 as shown in FIG. 13.

Figure 12:
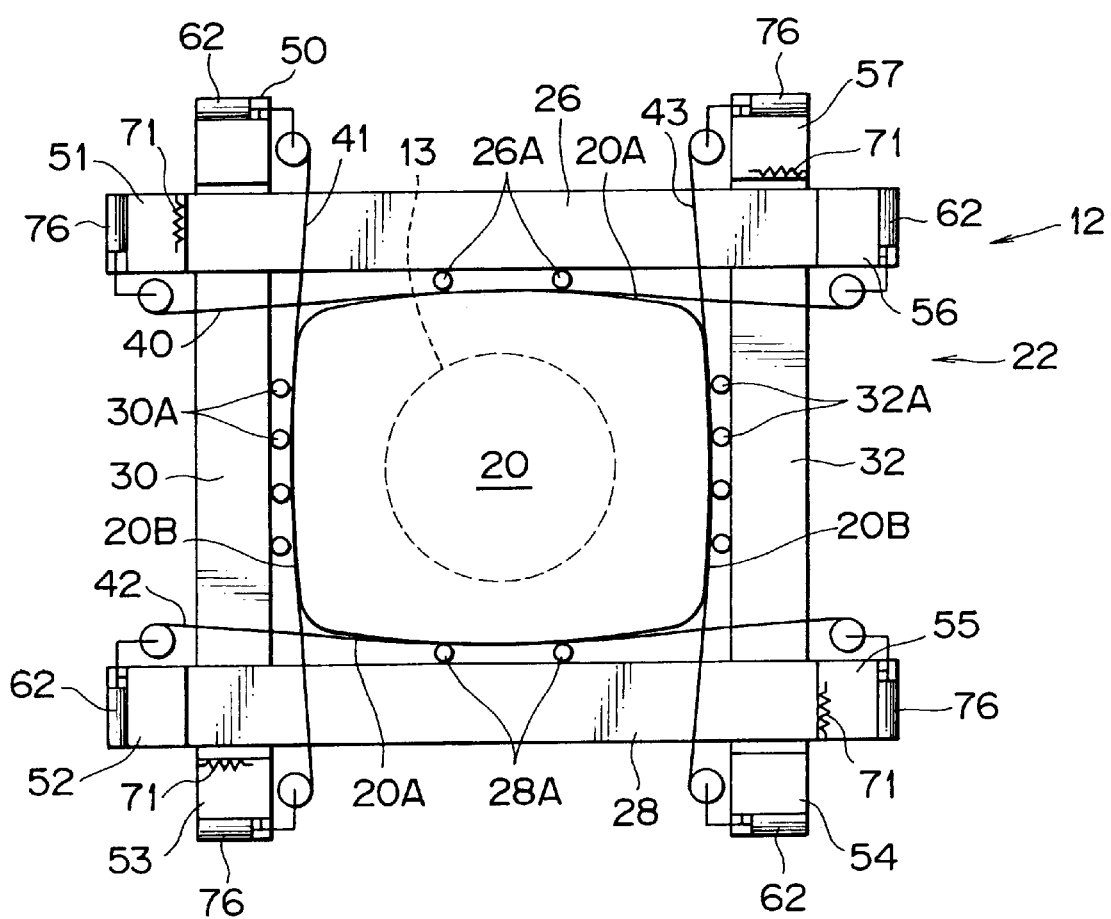
FIG. 12 is a view showing a state in which linear heating members are brought into contact with side surfaces of the cathode-ray tube for dividing the cathode-ray tube.

In the state shown in FIG. 11, the linear heating members 40, 41, 42 and 43 are positioned in the vicinity of the long-sides 20A and short-sides 20B of the cathode-ray tube 20. The state shown in FIG. 11 is entered to a state shown in FIG. 12. Specifically, the rods of the cylinder 62 and 76 of each of the eight pieces of holding means 50 to 57 shown in FIGS. 8 and 9 are extended, so that the linear heating members 40, 41, 42 and 43 are, as shown in FIG. 12, certainly brought into close-contact with the curved shapes of the long-sides 20A and short-sides 20B of the cathode-ray tube 20. In this case, since the linear heating members 40, 41, 42 and 43 are pushed onto the long-sides 20A and short-sides 20B of the cathode-ray tube 20, the springs 71 having given the biasing forces to the other ends of the linear heating members 40, 41, 42 and 43 as shown in FIG. 8 and 9 are extended and the levers 72 are turned in the direction F as shown in FIG. 8. As a result, the effective lengths of the linear heating members 40, 41, 42 and 43 are substantially extended, so that the linear heating members 40, 41, 42 and 43 can be certainly brought into close-contact with the long-sides 20A and short-sides 20B of the cathode-ray tube 20.

Figure 14:
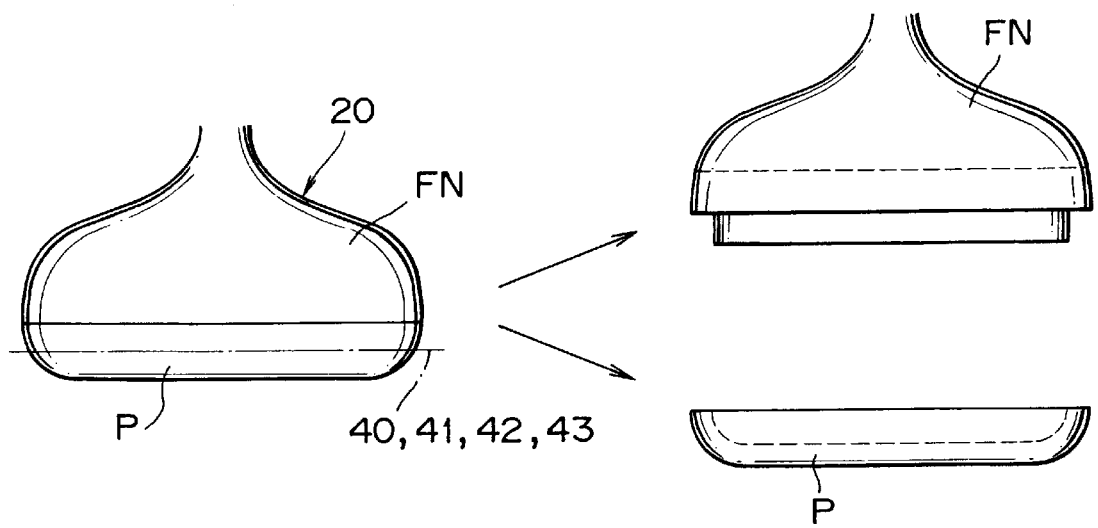
FIG. 14 is a view showing a state in which the cathode-ray tube is divided into a panel portion and a funnel portion.

After the four pieces of linear heating members 40, 41, 42, and 43 are thus brought into close-contact with the long-sides 20A and short-sides 20B of the cathode-ray tube 20, a specific amount of power, which is determined in accordance with the size of the cathode-ray tube 20, is applied from the power adjuster 104 shown in FIG. 13 as described above for a specific energizing time, to the four pieces of linear heating members 40, 41, 42 and 43. The specific energizing time and the specific amount of power are pre-determined in accordance with the size of the cathode-ray tube 20. The reason for this is that the thickness of a glass sheet forming the cathode-ray tube 20 differs depending on the size of the cathode-ray tube 20, and therefore, the power amount is required to be changed depending on the size of the cathode-ray tube 20. With the dividing condition thus strictly set, the cathode-ray tube 20 can be certainly divided into a panel portion P and a funnel portion FN as described in FIG. 14.

As shown in FIG. 15, before the work of dividing the cathode-ray tube 20 by the four pieces of the linear heating members, it may be desirable that grooves 20M be formed in four corners of the cathode-ray tube 20 with a diamond cutter or the like. With this configuration, by bringing each of the linear heating members 40, 41, 42 and 43 into contact with a substantially linear position connecting the two grooves 20M to each other, the cathode-ray tube 20 can be more certainly divided into the panel portion P and the funnel portion FN.

Figure 16A:
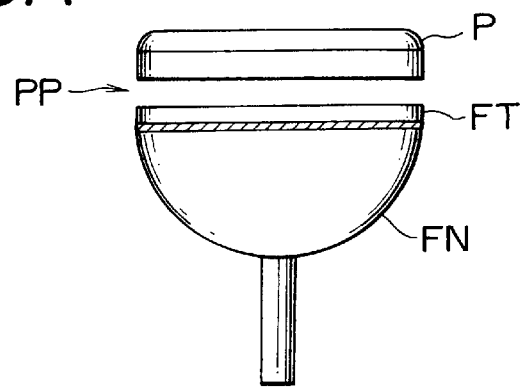
FIGS. 16A and 16B are views showing an example in which the cathode-ray tube is divided into a panel portion and a funnel portion.
Figure 16B:
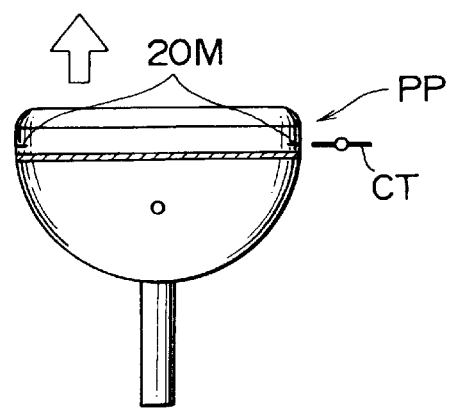

In this way, the linear heating members 40, 41, 42 and 43, which are also called as electric heat wires, can divide the cathode-ray tube 20 into the panel portion P and the funnel portion FN as shown in FIGS. 16A and 16B. At this time, it may be desirable that the cathode-ray tube 20 be divided along a location PP, offset onto the panel portion P side from a frit glass portion FT provided to seal the panel portion P and the funnel portion FN to each other. Accordingly, as shown in FIG. 16B, it may be desirable that the above groove (also called as a scratch) 20M be formed at the location PP with a cutter CT.

The reason why the panel portion P is separated from the funnel portion FN along the location PP is to prevent inclusion of lead contained in the glass forming the funnel portion FN into glass cullet of the panel portion P.

Figure 17:
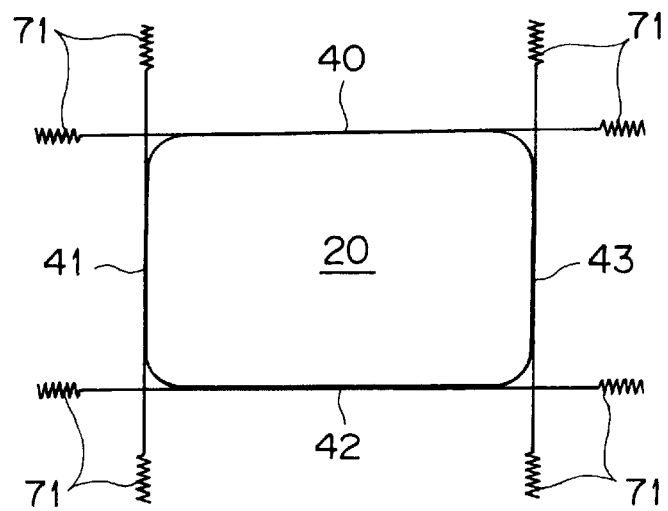
FIG. 17 is a plan view showing another embodiment of the cathode-ray tube dividing apparatus of the present invention.
Figure 18:
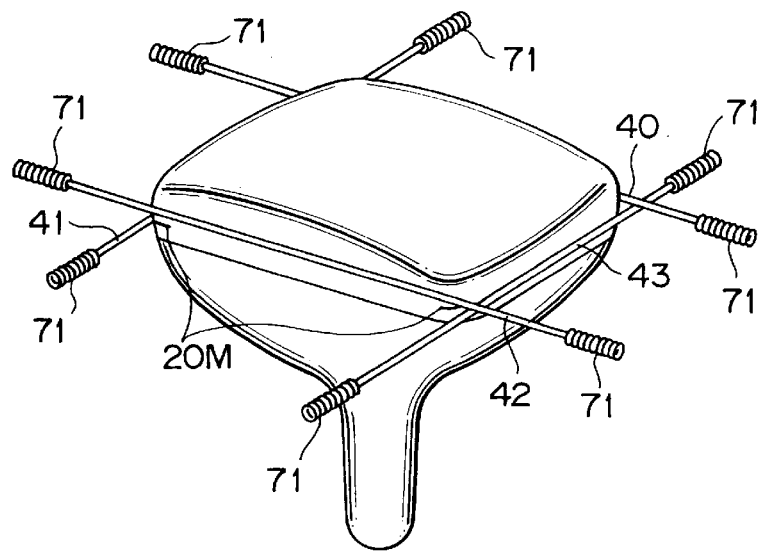
FIG. 18 is a perspective view of the embodiment shown in FIG. 17.

In the above embodiment, as shown in FIG. 7, one end of each linear heating member 40 is fixed and the other end is expanded/contracted by the spring 71 as the biasing means, however, as shown in FIGS. 17, 18 and 21, springs 71 may be provided at both ends of each of the linear heating members 40, 41, 42 and 43.

With respect to energization of the linear heating members 40, 41, 42 and 43 (which are also called as electric heat wires), preferably, the current may be set at, for example, 18A, the voltage may be set in a range of 40V to 50v, and the power may be set in a range of 0.7 kw to 0.9 kw.

Figure 19A:
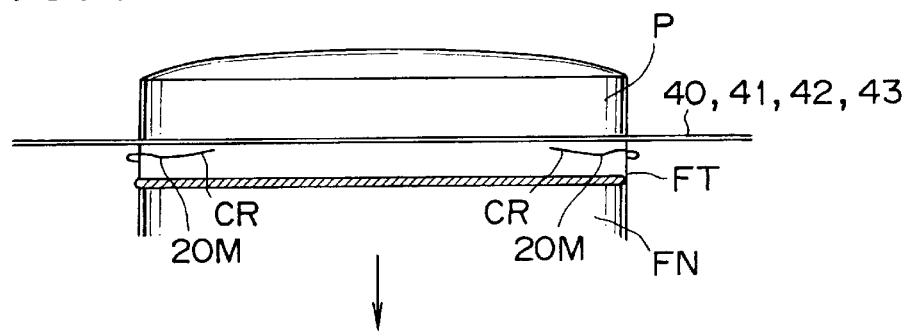
FIGS. 19A and 19B are views showing positions at which the linear heating members are brought into contact with the cathode-ray tube and also showing a crack growing state.
Figure 19B:
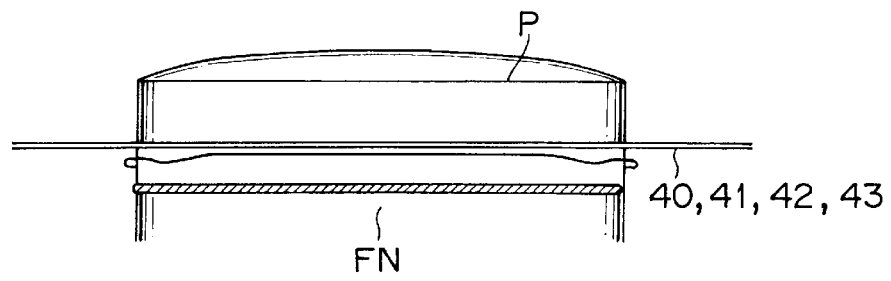

As shown in FIGS. 19A and 19B, upon dividing the cathode-ray tube into the panel portion P and the funnel portion FN, by bringing the linear heating members 40, 41, 42 and 43 into close-contact with the cathode-ray tube, cracks CR grow from the scratches 20M, so that as shown in FIG. 19B, the panel portion P and the funnel portion FN can be perfectly and smoothly separated from each other.

In this case, as shown in FIGS. 20A and 20B, by locating an intersection, for example, between the linear heating members 40 and 41 near the groove 20M, a tension occurs around the groove 20M as shown in FIG. 20C, to induce a concentrated crack thereat. This is because glass is weak against tension. As a result, the cathode-ray tube can be more smoothly divided into the panel portion P and the funnel portion FN. In addition, the linear heating member, which is designed to be slid and brought into contact with the side surface of a cathode-ray tube, sufficiently keeps up with a cathode-ray tube having any size.

In the example shown in FIGS. 17, 18 and 21, since the springs 71 disposed at both ends of each of the linear heating members 40, 41, 42 and 43 absorb the deflection of the linear heating member, the linear heating member can be certainly brought into close-contact with the side surface of the cathode-ray tube and also the cracking direction can be induced in a specific direction.

The linear heating member may be formed of one wire, however, it can be formed of a strand of several wires. The adoption of such a strand is effective to make constant the calorie supplied to glass and to prevent the deformation of the linear heating member.

In the embodiment of the present invention, the power adjuster (power supply) 104 shown in FIG. 13 supplies a power in two steps to the four pieces of linear heating members 40, 41, 42 and 43 in accordance with the steps of generation and growth of cracks. To be more specific, as described above, on the basis of the energizing condition shown in FIG. 22, the power adjuster 104 supplies the relatively small first energizing power PW1 in the crack generating period CT1, and after generation of cracks, the power adjuster 104 supplies the second energizing power PW2 larger than the first energizing power PW1 in the crack growing period CT2. That is to say, by rapidly increasing the supply amount of power after generation of cracks, the cracks having been already generated rapidly grow by heat-shock.

In the related art dividing method, an invariable power is applied to heat a cathode-ray tube with linear heating members, and accordingly it is required to grow cracks owing to a blow by tapping corners of the cathode-ray tube.

On the contrary, according to the embodiment of the present invention, it is possible to simply and certainly grow cracks not by tapping on corners of the cathode-ray tube but only by applying a power in two steps from the power adjuster 104 shown in FIG. 13 to the linear heating members, and hence to certainly divide the cathode-ray tube into the panel portion and the funnel portion.

According to the embodiment of the present invention, there can be obtained the following merits:
(1) Shortening of Time Required to Divide Cathode-Ray Tube
(1-1) Shortening of Dividing Time by Shortening of Energizing Time In the related art dividing method, for dividing a cathode-ray tube having a size of about 20 inches, it is required to energize heating members for about 150 seconds, for example. Of the energizing time, about 60 seconds is spent on generation of cracks, and the remaining time, about 90 seconds is spent on growth of the cracks by tapping on corners of the cathode-ray tube with a tapping unit or the like to such an extent as to certainly divide the cathode-ray tube.

According to this embodiment, assuming that the crack generating period CT1 shown in FIG. 22 is 60 seconds, the crack growing period CT2 can be suppressed at a value ranging from, for example, 10 to 15 seconds, thereby significantly reducing the energizing time. This makes it possible to shorten the energizing time, that is, the time to divide the cathode-ray tube and also reduce the energizing power amount, and hence to lower the cost required to divide the cathode-ray tube.

(1-2) Shortening of Dividing Time by Omitting of Tapping Action Using Tapping Unit In the related art dividing method, it is required to divide a cathode-ray tube into a panel portion and a funnel portion by tapping, after generation of cracks, corners of the cathode-ray tube using tapping units. In order to achieve such a function, these units of two pieces are required to be provided along a diagonal line of the cathode-ray tube, and to be operated twice each for tapping on four corners of the cathode-ray tube.

On the contrary, according to this embodiment, since the necessity of provision of such tapping units is omitted, it is possible to shorten the time to divide the cathode-ray tube by tapping, for example, to 20 seconds.

(2) Reduction in Cost

As described above, according to this embodiment, since the energizing time is reduced to a half, the necessity of provision of tapping units is eliminated, and the dividing time is reduced by eliminating such a tapping action, it is possible to simplify the structure of the dividing apparatus and reduce the cost required to divide a cathode-ray tube, and hence to significantly reduce the cost required for subjecting the cathode-ray tube to waste treatment.

In this way, the dividing apparatus of the present invention can efficiently divide a cathode-ray tube into a panel portion and a funnel portion by applying a power to the heating members while varying the power amount and energizing time depending on the size of a cathode-ray tube, thereby generating cracks due to thermal strain on the side surfaces of the cathode-ray tube, for effectively growing the cracks to such an extent as to certainly divide the cathode-ray tube.

According to this embodiment, the contact of the linear heating members with a cathode-ray tube is made constant irrespective of the size and the degree of curvature of the cathode-ray tube by action of the positioning sliders and tension sliders provided on the holding means, to thereby improve the yield in dividing the cathode-ray tube. Further, by controlling the power amount applied to the linear heating members and the energizing time depending on the size of a cathode-ray tube, it is possible to enhance the dividing yield and the reliability of the diving work.

As described above, according to the present invention, it is possible to simply and stably divide a cathode-ray tube in a shortened time.

While the preferred embodiments of the present invention have been described using specific terms, such description is for illustrative purposes only, and it is to be understood that changes and variations may be made without departing from the spirit or scope of the following claims.

What is claimed is:

1. A cathode-ray tube dividing method for dividing a used cathode-ray tube into a panel portion and a funnel portion, comprising the steps of:

fixedly positioning the used cathode-ray tube at a specific location;

pressing a linear heating means onto side surfaces of the cathode-ray tube thus positioned;

generating cracks on the side surfaces of the cathode-ray tube by supplying a first value of power to said linear heating means; and growing the cracks, after generation of the cracks, by supplying a second value of power larger than the first value of power to said linear heating means.

2. A cathode-ray tube dividing method according to claim 1, further comprising the steps of:

generating cracks on the side surfaces of the cathode-ray tube along a division line by supplying a first value of power preset in accordance with the size of the cathode-ray tube to said linear heating means; and growing the cracks by supplying, after generation of the cracks, a second value of power preset in accordance with the size of the cathode-ray tube and being larger than said first value of power to said linear heating means.

3. A cathode-ray tube dividing method for dividing a used cathode-ray tube into a panel portion and a funnel portion, comprising the steps of:

fixedly positioning the used cathode-ray tube at a specific location;

forming grooves for inducing division in side surfaces of the cathode-ray tube at part of locations to be divided;

pressing a linear heating means onto the side surfaces of the cathode-ray tube along said grooves;

generating cracks on the side surfaces of the cathode-ray tube by supplying a first value of power to said linear heating means; and growing the cracks, after generation of the cracks, by supplying a second value of power larger than said first value of power to said linear heating means.

4. A cathode-ray tube dividing method for dividing a used cathode-ray tube into a panel portion and a funnel portion, comprising the steps of:

fixedly positioning a cathode-ray tube at a specific location;

forming grooves for inducing division in side surfaces of the cathode-ray tube at positions offset onto the panel portion side from a joining line between the panel portion and a funnel portion;

pressing a linear heating means onto the side surfaces of the cathode-ray tube along said grooves;

generating cracks on the side surfaces of the cathode-ray tube by supplying a first value of power to said linear heating means; and growing the cracks, after generation of the cracks, by supplying a second value of power larger than said first value of power to said linear heating means.

5. A cathode-ray tube dividing apparatus for dividing a used cathode-ray tube into a panel portion and a funnel portion, comprising:

a positioning means for fixedly positioning the used cathode-ray tube at a specific location; and a cathode-ray tube heating means which is brought into contact with a specific portion on side surfaces of the cathode-ray tube for linearly heating said specific portions; wherein said cathode-ray tube heating means comprises:

linear heating members for imparting thermal strain to the side surfaces of the cathode-ray tube upon receiving an electrical power, thereby dividing the cathode-ray tube into the panel portion and the funnel portion; and a power supply for supplying a heating power to said linear heating members, said power supply being adapted to supply a first value of power for generating small cracks on the side surfaces of the cathode-ray tube to said linear heating members, and to supply, after generation of the cracks, a second value of power larger than said first value of power to said linear heating members.

6. A cathode-ray tube dividing apparatus according to claim 5, wherein said cathode-ray heating means comprises a control means for independently setting and recording the values of said first and second values of heating powers to be supplied from said power supply to said heating members in accordance with the size or condition of the cathode-ray tube.

7. A cathode-ray tube dividing apparatus according to claim 5, wherein said cathode-ray tube heating means comprises a control means for supplying a first value of power for generating cracks on the side surfaces of the cathode-ray tube to said linear heating members for first specified period to generate cracks, and supplying, after generation of the cracks, a second value of power larger than said first value of power to said linear heating members for second period shorter than said specified first period defined for said first value of power.

* * * * *